June 11, 1935. H. L. ZABRISKIE 2,004,496
SEWING MACHINE MOTOR CONTROLLER
Filed Jan. 8, 1932
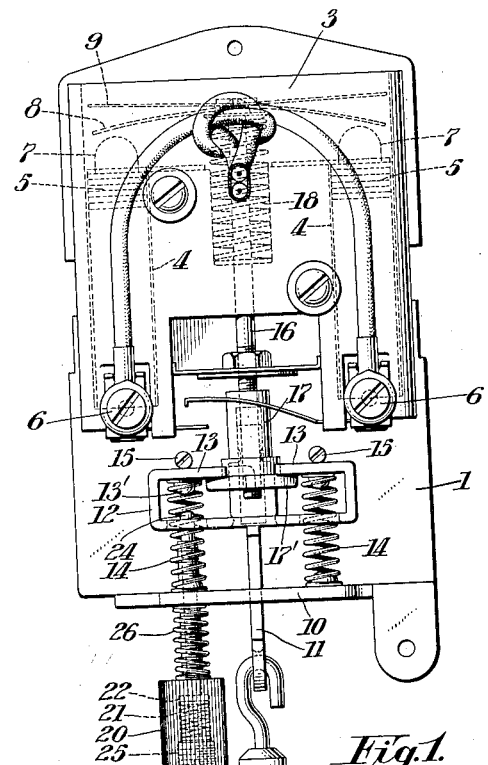
Fig.1.
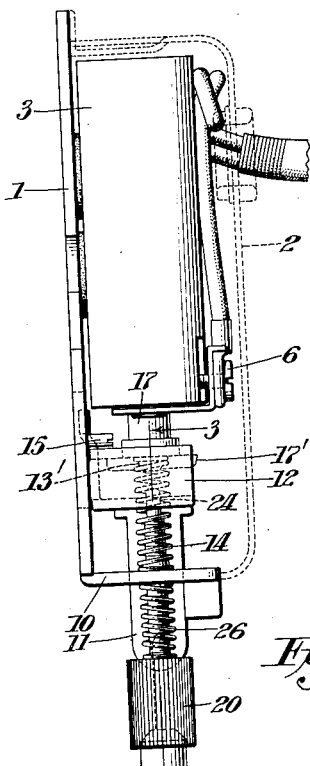
Fig.2.
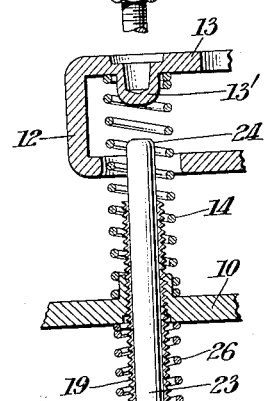
Fig.3.
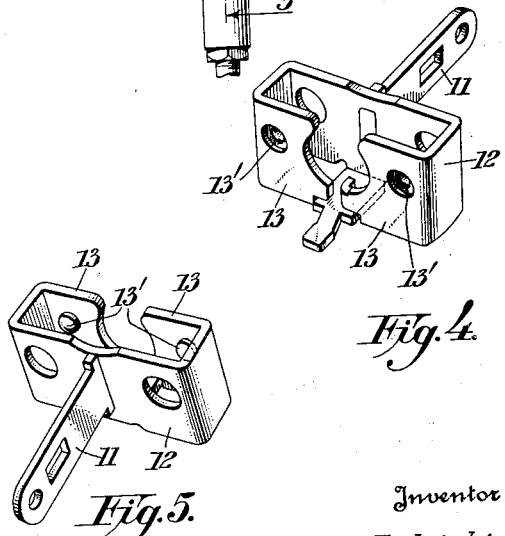
Fig.4.
Fig.5.
Inventor
Henry L. Zabriskie
By Henry Miller
Attorney
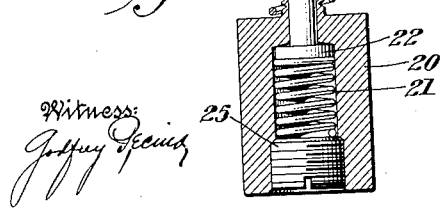
Witness:

Patented June 11, 1935

2,004,496

UNITED STATES PATENT OFFICE 2,004,496

SEWING MACHINE MOTOR CONTROLLER

Henry L. Zabriskie, Westfield, N. J., assignor to The Singer Manufacturing Company, Elizabeth, N. J., a corporation of New Jersey Application January 8, 1932, Serial No. 585,409

4 Claims. (Cl. 201—51)

This invention relates to motor-driven sewing machines equipped with a controller and means influenced by the operator for shifting the movable element of the controller to regulate the speed of the motor and of the sewing machine driven thereby.

For certain classes of sewing machine work, such as embroidering and darning, it is desirable to maintain a predetermined slow working sewing machine speed and this has heretofore imposed a physical strain upon the operator as it necessitated the holding of the movable controller element in a closely controlled floating position intermediate its extreme or "off" and "full on" positions.

It has been proposed to provide the controller of an outfit of this nature with a stop against which the operator may maintain an element of the movable train of mechanism of the controller, to limit the machine-speed to that desired for the work in hand, but it is found that a mere stop interferes with the proper operation of the machine for the reason that when it is set to secure the desired slow running machine-speed, the machine will not start when the controller is shifted from "off" position to the limiting position determined by the stop. This is because the controller, in its slow-speed running position, will not pass enough current to start the motor under the static friction of the motor and sewing machine bearings. Hence it is necessary, with a device of the nature heretofore proposed, for the operator to give the machine a boost by handling the balance wheel every time the machine is started.

Another objection to a controller, such as heretofore fitted with a stop, is that the variable resistance element comprises a series of contact buttons over which plays a movable contact arm. These buttons cannot conveniently be made sufficiently numerous to secure the finely graduated machine speeds required.

The present invention has for an object to provide a sewing machine motor-controller which may be readily manipulated by the operator, without objectionable physical strain, to start the machine and hold any desired predetermined speed, or to exceed such speed if desired.

With the above and other objects in view, as will hereinafter appear, the invention comprises the devices, combinations, and arrangements of parts hereinafter set forth and illustrated in the accompanying drawing of a preferred embodiment of the invention, from which the several features of the invention and the advantages attained thereby will be readily understood by those skilled in the art.

Fig. 1 is a front elevation of a sewing machine motor-controller embodying the invention. Fig. 2 is a side view of the same. Fig. 3 is an enlarged section on the line 3—3, Fig. 2, and Figs. 4 and 5 are perspective views of an element of the controller-operating draw-bar.

The invention is shown as embodied in a carbon compression type motor-controller or rheostat such as disclosed in the patent to Chason, No. 1,792,818, of Feb. 17, 1931. This controller has an operating draw-bar which is connected by a rod to a treadle-plate enabling the operator to nicely control the speed of the sewing machine to meet the particular sewing requirements.

Such a controller comprises a casing including a base 1 and removable cover 2 within which and upon the base 1 is mounted the carbon compression type rheostat having the usual porcelain body 3 formed with spaced wells or chambers 4 for the stacks of carbon resistance disks 5 which substantially fill the wells 4 and are electrically connected to the terminals 6. The stacks 5 also comprise the compression heads 7 which are bridged by the bow-spring contact-member 8 backed by a stiffer spring-member 9 substantially in accordance with the disclosure of the patent to D. H. Chason, No. 1,643,292, of Sept. 27, 1927.

Rising from one end of the base 1 is an end wall 10 having a slot through which passes the draw-bar 11 connected at its inner end to the hollow rectangular cross-head 12 the ends 13 of the legs of which are directed toward one another but are spaced apart. Recovery springs 14 serve to restore the cross-head 12 and draw-bar 11 to initial or non-running position with the cross-head portions 13 contacting with the stop-screws 15.

From the centers of the bow-spring 8 and backing spring 9 there extends in line with the draw-bar 11 a pull-rod 16 having a screw-threaded end carrying an adjustable nut 17 whose shank passes through the space between the ends of the cross-head portions 13 and whose head 17' is engaged by the under faces of the portions 13 to transmit the pull upon the draw-bar 11 to the pull-rod 16. The nut 17 is so adjusted that the bow-spring 8 will be carried out of contact with the pressure-heads 7 by the weak recovery spring 18 when the strong recovery springs 14 are holding the cross-head 12 in engagement with the stops 15. So far as described, the controller does not differ essentially from that disclosed in the Chason Patent No. 1,792,818, previously referred to.

Threaded into the end wall 10 coaxially with one of the springs 14 is the threaded shank 19 of an adjustable stop-screw including the knurled head 20 which is accessible to the operator exteriorly of the casing 1, 2. The knurled head 20 is hollow and houses a relatively stiff spring 21 which presses upon the head 22 of a plunger 23 passing longitudinally through the threaded stem 19 and projecting at 24 beyond the end of the latter and constituting a yielding tip for the adjustable stop-screw 19, 20. The spring 21 is backed by the breech screw 25. A coil-spring 26 surrounding the exposed portions of the stop-screw stem 19 frictionally holds the stop-screw in any adjusted position. The yielding tip 24 of the stop-screw is in position to be engaged by the downwardly projecting tip 13' of the cross-head 12.

In the operation of the device, the operator exerts a pull upon the draw-bar 11 until it is perceived by the sense of feeling that the cross-head 12 has engaged the yielding tip 24 of the stop-screw. If, as is likely, the machine does not start, the operator exerts a further pull upon the draw-bar 11 to start the machine; the spring 21 yielding as the tip 24 is forced into the stop-screw stem 19. After the static friction of the machine has been overcome by the pull of the draw-bar beyond the point where the operator is sensible of the resistance of the yielding stop-screw, the operator relieves the pull upon the draw-bar until it is perceived by the sense of feeling that the draw-bar cross-head is just touching the yielding tip 24 of the stop-screw. This gives the desired slow running speed suitable for embroidering and darning operations. The spring 21 is made stiff enought to enable the operator to readily feel and hold the position of engagement of the draw-bar head 12 with the yielding tip 24 without compressing such spring. It is not made so stiff, however, that it is burdensome to the operator to compress it for starting purposes.

The stepless range of speeds made possible by the use of a carbon controller is particularly advantageous in this connection, in combination with a finely adjustable or screw-threaded yielding stop, as such combination enables any selected operating speed to be closely predetermined and closely held. The construction and location of the stop, relative to the elements of the controller are of advantage in that the stop-screw is readily accessible for adjustment, yet is disposed in a protected position. It is of simple construction and is easily applied to and removed from the controller as a self-contained unitary assembly without disassembly of any of the controller parts.

The stop-screw 19, 20 may be unscrewed far enough to permit the draw-bar 11 to be pulled downwardly as far as it will go without engagement of the cross-head 12 with the yielding tip 24. Hence, the stop device may be unscrewed from operative to inoperative position without removing it from the controller casing.

While the invention is disclosed in one specific embodiment, as applied to a foot-operated sewing machine motor-controller, it is not to be understood as limited in its broader aspects to a foot-operated controller.

Having thus set forth the nature of the invention, what I claim herein is:—

1. The combination with a carbon compression rheostat having an operating draw-bar movable in one direction by the operator to decrease the electrical resistance thereof, of an initially disengaged stop-screw disposed in the path of and adjustable in the direction of movement of said draw-bar, and spring means permitting said stop-screw to be yieldingly engaged by said draw-bar in the resistance decreasing movement of the latter.

2. The combination with a carbon compression rheostat having an operating draw-bar movable in one direction by the operator to decrease the electrical resistance thereof, of a stop-screw disposed in the path of and adjustable in the direction of movement of said draw-bar, said stop-screw having an initially disengaged yielding tip adapted to be engaged by said draw-bar in the resistance decreasing movement of the latter.

3. The combination with a carbon compression rheostat having an operating draw-bar movable in one direction by the operator and a relatively strong recovery spring opposed to the operative force exerted upon the draw-bar by the operator, of an initially disengaged stop-screw disposed in the path of and adjustable in the direction of movement of said draw-bar, and spring means permitting said stop-screw to be yieldingly engaged by said draw-bar in the resistance decreasing movement of the latter, said spring-means being stiff enough relative to said recovery spring to be perceptibly felt by the operator.

4. The combination with a casing, of a carbon compression rheostat housed within said casing, a manually operated draw-bar extending into said casing and operatively connected to said rheostat, and an adjustable stop-screw mounted on said casing, said stop-screw having a head accessible to the operator exteriorly of said casing and a yielding tip within said casing in position to perceptibly resist movement of said draw-bar beyond a predetermined position.

HENRY L. ZABRISKIE.